G. R. BROBST.
PROCESS FOR THE MANUFACTURE OF PHOSPHATE.
APPLICATION FILED MAR. 26, 1919.
1,360,248.
Patented Nov. 23, 1920.
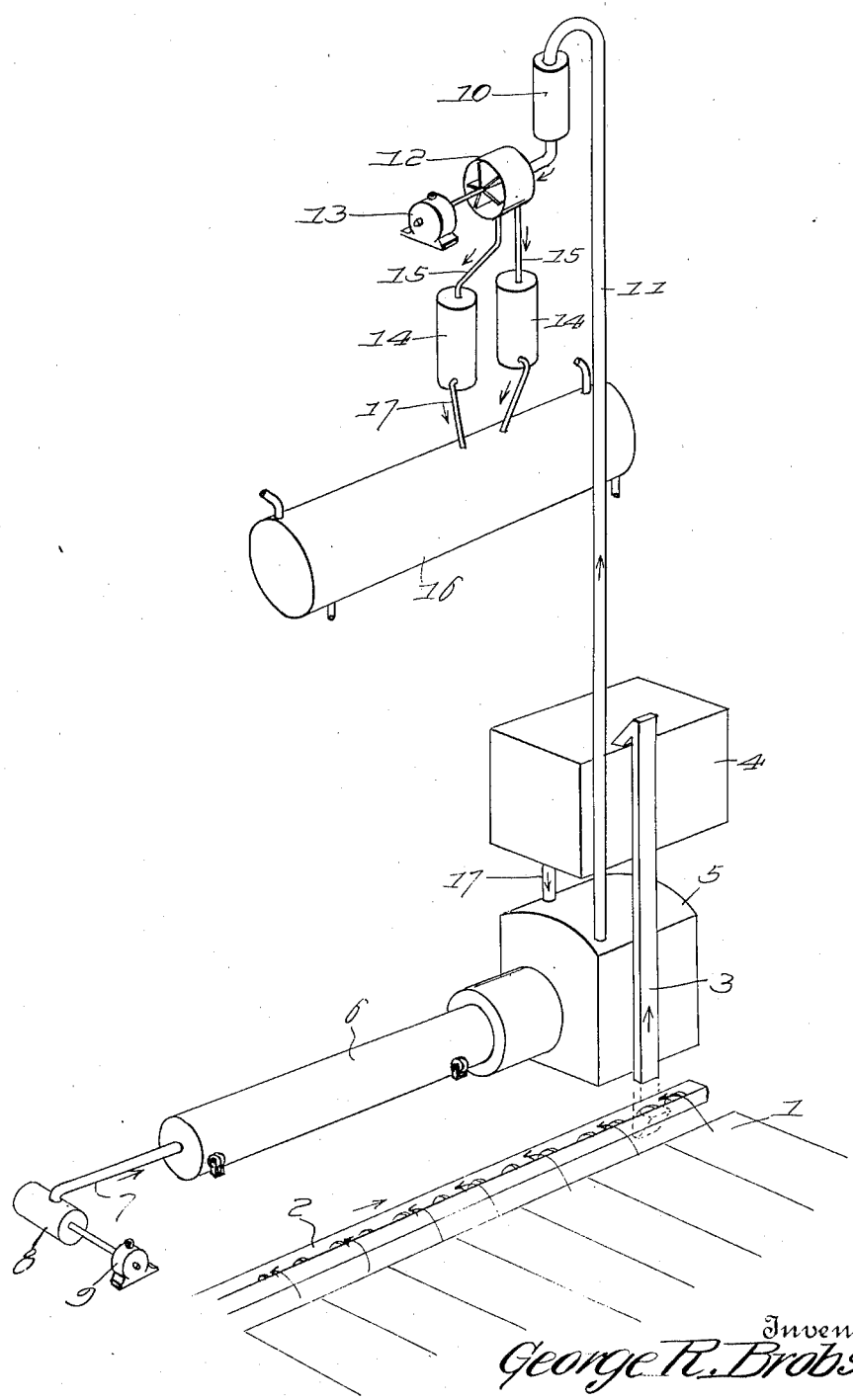
Inventor
George R. Brobst,
By
G. Hume Talbert
Attorney

UNITED STATES PATENT OFFICE.

GEORGE R. BROBST, OF ALLENTOWN, PENNSYLVANIA.

PROCESS FOR THE MANUFACTURE OF PHOSPHATE.

1,360,248. Specification of Letters Patent. Patented Nov. 23, 1920.

Application filed March 26, 1919. Serial No. 285,185.

*To all whom it may concern:*

Be it known that I, GEORGE R. BROBST, citizen of the United States, residing at Allentown, in the county of Lehigh and State of Pennsylvania, have invented new and useful Improvements in Processes for the Manufacture of Phosphate, of which the following is a specification.

The new process herein described and illustrated in a general way constitutes the use of a rotary kiln for making phosphatic acid available for plant food and in this process sodium carbonate is employed—an alkali instead of an acid. Both the sulfuric acid process and the process herein described make phosphate rock citrate soluble—that is, soluble in a solution of citric acid of prescribed strength. In the sulfuric acid process, the sulfuric acid combines with a part of the lime of the calcium phosphate, leaving acid calcium phosphate and forming calcium sulfate. When the salt of an acid is treated or acted upon by a stronger acid, a salt of the stronger acid is produced. As phosphoric acid is a strong acid, only a part of the calcium is removed and this forms calcium sulfate or gypsum. In the new process, that involving the use of the rotary kiln, sodium carbonate, and alkali, is used to remove the calcium. A basic material is therefore used to remove the calcium and therefore a similar reaction takes place, involving the principle that when a salt or a base is acted upon by a stronger base, a salt of that stronger base is produced. The equation showing this reaction may be written as follows:

$$Ca_3(PO_4)_2 + 2Na_2CO_3 = CaNa_4(PO_4)_2 + 2CaO + 2CO_2.$$

When an insufficient amount of sodium carbonate is used, the reaction will be incomplete and decalcium phosphate will be formed as chemically expressed in the following:

$$Ca_3(PO_4)_2 + Na_2CO_3 = Ca_2Na_2(PO_4)_2 + CaO + CO_2.$$

Where there is a large excess of sodium carbonate, there is a complete decomposition of the calcium salt as follows:

$$Ca_3(PO_4)_2 + 3Na_2CO_3 = 2Na_3PO_4 + 3CaO + 3CO_2.$$

Where sodium carbonate is used with iron phosphate, the reaction is as shown below:

$$Fe_3(PO_4)_2 + 3Na_2CO_3 = 2Na_3PO_4 + 3FeO + 3CO_2.$$

When sodium carbonate is used as a reacting agent with aluminium phosphate, the reaction is as follows:

$$2AlPO_4 + 3Na_2CO_3 = Al_2O_3 + 2Na_3PO_4 + 3CO_2$$

and with magnesium phosphate as follows:

$$Mg_3(PO_4)_2 + 2Na_2CO_3 = MgNa_4(PO_4)_2 + 2MgO + 2CO_2.$$

With the new or rotary kiln process herein described, the work of the production of phosphate is carried out under heat. The process is therefore dry, and as phosphoric acid and its salts are non-volatile at high temperature, there is no loss due to volatilization. There is no acid formed, due to the presence of sulfuric acid, thus producing a wet, sticky, viscous product.

Limestone can be used with the present process and thus a phosphate rich in lime is produced with a greater value to the resultant fertilizer. Feldspar, a silicate of potash and soda can be used and the result of the process upon this potash bearing mineral is that the lime and soda reacting with the acid silicate break up the chemical structure of the feldspar and thus liberate silica and likewise potash and soda. Much of the potash and soda remains with the clinker, forming a potash phosphate. Some of the potash and soda passes off with the flue gases and provision is made for recovering these and purifying them by lixiviation, when they may be used for soap manufacture or returned and mixed with the raw material. The main feature of the new process consists in mixing raw phosphate rock in the pulverized form with sodium carbonate, feldspar, limestone, iron ore, furnace slag and flue dust and feeding this mixture into the rotary kiln where it is heated to incipient fusion, using pulverized coal as fuel. The resulting phosphatic clinker upon cooling is reground and all the phosphoric acid is then in the available or citrate soluble form. Provision is made for recovering the waste gases by a spray of ammoniated water, a fan being employed to create a suction upon such gases.

In the drawing there is shown a perspective diagrammatic view of the layout of a plant for carrying the improved process into effect, but to this layout or to the successive steps herein recited, the invention is not to be restricted except in the matter of restrictions imposed by the subjoined claims.

There is provided in the plant a plurality of bins 1, there being a bin for each of the ingredients used for carrying the process into effect; namely, phosphate rock, limestone, sodium carbonate, flue dust, furnace slag, iron ore and feldspar. These bins are positioned side by side and a conveyer 2 is arranged in front of them so that the ingredients of each bin may be carried forward to an elevator 3 from which the ingredients are deposited in a bin 4, positioned above a furnace and boiler 5 in back of which and connecting therewith there is a rotary kiln 6, fed from its rear end through a tube 7 connecting with an aero pulverizer 8, the latter being driven by direct connected motor 9. Positioned high above the bin 4, for example, on one of the upper floors of the building when the bin and rotary kiln are on the lower floor, there is a cooler 10, a pipe 11 connecting the upper end of this cooler with the furnace 5. The contents of this cooler are extracted therefrom by a conventional form of exhaust fan 12, driven by a direct connected motor 13, the contents of the cooler being transferred through the medium of the fan to the tanks 14, appropriate connections 15 between the tanks and the fan being provided. The tanks are appropriately connected to the evaporator 16 by suitable tubular connections 17.

When the proper proportions of the ingredients indicated in the foregoing equations have been transferred to the bin 4, they are admitted from the latter through the tubular connection 17 into the furnace 5 and then into the kiln 6, finely divided fuel being admitted to the kiln from the aero pulverizer 8. The mixture is thus calcined and the result of this calcination is the formation of calcium oxid, carbon dioxid, potassium oxid, sodium oxid and sulfuric anhydrid. Since the gases from the rotary kiln contain soda, potash and carbon dioxid as a result of the combustion of the fuel and because of the presence of calcium carbonate, all of these gases can be recovered by a spray of ammoniated water playing directly upon them. The gases pass through the pipe 11 to the cooler 10 where they encounter the ammonia water cooling spray, being drawn into the cooler by the fan 12. The potash and the soda volatilized by the high heat of the kiln are readily absorbed by the ammoniated water and carried to the tanks 14 along with a large amount of dust. A large amount of the carbon dioxid is recovered by the ammoniated water and is likewise found in the liquor. Potassium oxid, sodium oxid and a certain amount of sulfur dioxid being present in the waste gases, the last combines with the oxids of both the soda and the potash. A large amount of carbon dioxid being present, this combines with the remainder of the oxids of the soda and potash. All the soda and all the potash in the gases are thus recovered as shown in the following equations:

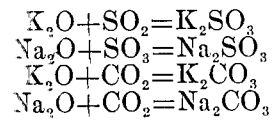

$$K_2O+SO_2=K_2SO_3$$
$$Na_2O+SO_3=Na_2SO_3$$
$$K_2O+CO_2=K_2CO_3$$
$$Na_2O+CO_2=Na_2CO_3$$

Incident to these chemical reactions the sulfur dioxid is recovered combining with the alkalis of soda and potash.

The recovery of $CO_2$ or carbon dioxid by the ammonium hydroxid present in the ammoniated water may be expressed as follows:

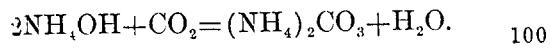

$$2NH_4OH+CO_2=(NH_4)_2CO_3+H_2O.$$

The amount of carbon dioxid gas recovered depends; first, upon the amount of ammonia used; second, upon the amount of water used; third, upon the temperature of the gases. The reactions will take place at 70 degrees centigrade, or between that point and 100 degrees centigrade. The recovery of carbon dioxid is useful because ammonium carbonate is largely used in the arts and not unusually where ammonia could not be used. The improved process is therefore a convenient one for the manufacture of ammonium carbonate. The sludge or liquor obtained by spraying the gases as they enter the cooler 10 is allowed to drain off to the tanks 14 and the solids allowed to settle therein. The liquor or brine is then passed to the evaporator 16 where the salts are allowed to crystallize, the liquids being evaporated. The solids in the sludge, after separating the same, are dried and returned to the kiln.

A large part of the soda and potash remain in the kiln with the resulting clinker and this clinker may be pulverized for the recovery of these ingredients.

Due to the increasing scarcity of sulfuric acid and the increasing production of sodium carbonate, phosphate can be produced at a lower cost by the process herein described, that of the use of the rotary kiln, than by the sudfuric acid process.

The invention having been described, what is claimed as new and useful is:

1. The process for rendering phosphate and potash available which consists in calcining a mixture of phosphate rock, feldspar, limestone, iron ore, furnace slag and sodium carbonate and subsequently collecting the volatilized gases by a spray of ammoniated water.

2. The process for rendering phosphate and potash available which consists in calcining a mixture of phosphate rock, feldspar, limestone, iron ore, furnace slag and sodium carbonate, then conducting the volatilized gases to a cooling tank, and then subjecting the said gases while in the tank to a cooling spray of ammoniated water.

3. The process herein described consisting in heating to incipient fusion a mixture of phosphate rock, feldspar, limestone, iron ore, furnace slag, and sodium carbonate, then collecting the volatilized gases with a spray of ammoniated water, then allowing the resultant sludge or liquor to settle, and finally evaporating the liquids to permit the salts to crystallize.

In testimony whereof I affix my signature.

GEORGE R. BROBST.